March 15, 1960 K. STEISSLINGER 2,928,323
PHOTOGRAPHIC CAMERA WITH COUPLED EXPOSURE METER
Filed April 29, 1959
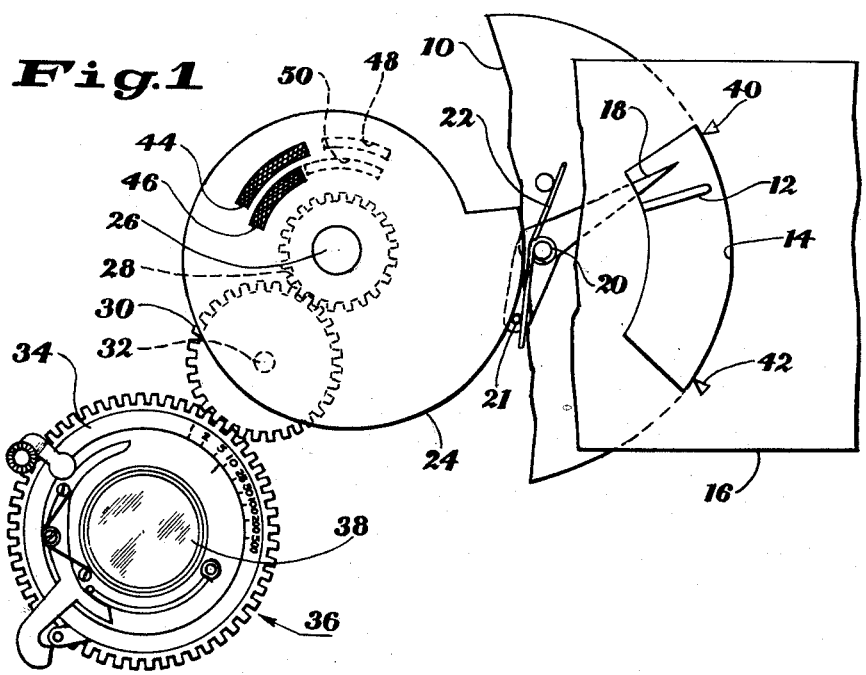
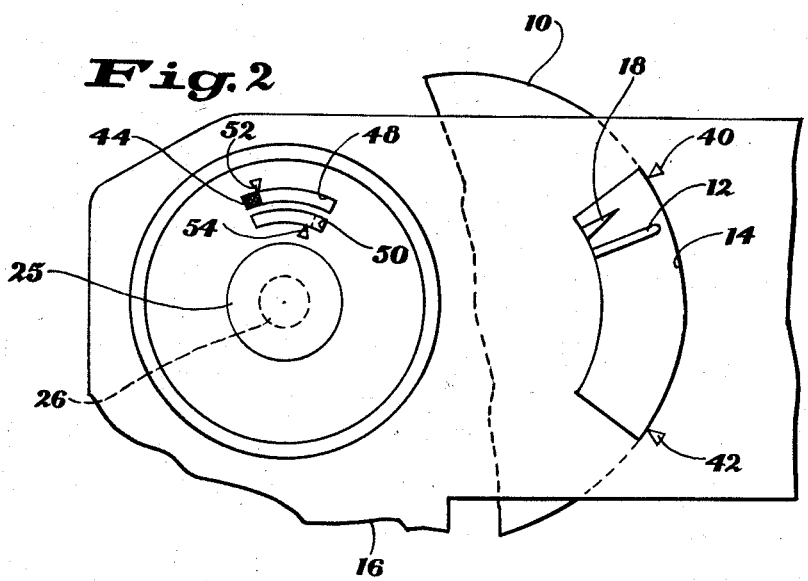
Kurt Steisslinger
INVENTOR.
BY R. Frank Smith
Robert W. Hampton
ATTORNEYS United States Patent Office 2,928,323
Patented Mar. 15, 1960

2,928,323

PHOTOGRAPHIC CAMERA WITH COUPLED EXPOSURE METER

Kurt Steisslinger, Stuttgart-Hedelfingen, Germany, assignor to Eastman Kodak Company, Rochester, N.Y.

Application April 29, 1959, Serial No. 809,652

Claims priority, application Germany May 17, 1958

8 Claims. (Cl. 95—10)

The present invention relates to a photographic camera having a coupled exposure meter and more particularly concerns a visual signal for such cameras to indicate the extent by which the exposure meter is operating beyond its useful range.

Numerous cameras have been designed for using an exposure-meter pointer in cooperation with a follow-up pointer to adjust an exposure-regulating device to its proper setting as a function of scene brightness. In such cameras the follow-up pointer is coupled to the exposure-regulating device and its position is matched to that of the meter pointer to achieve proper adjustment of the regulating device. The latter device generally has a range of settings greater than the useful range of the exposure meter, although the meter pointer is usually able to move beyond the limits of this useful range. When the photographer adjusts the exposure-regulating device to match the pointers at a position outside the useful meter range, it is convenient if he can be apprised of the extent to which the pointers lie beyond the useful meter range. However, exposure meters ordinarily have extremely low deflection characteristics beyond the limits of their useful range, so that mere visual observance of the meter itself is an inadequate indication of the extent to which the pointers are outside that range.

It is therefore a primary object of the present invention with respect to such cameras to apprise the photographer of the extent to which the follow-up pointer lies beyond the useful meter range. This object is achieved by providing a fixed index mark in cooperation with a movable mark on a cam which drives the follow-up pointer and which moves through an angle significantly greater than the angular movement of the follow-up pointer for any given movement of the latter. Preferably, the two index marks coincide when the follow-up pointer coincides with a mark indicating the limit of the useful meter range.

It is therefore a further object of the invention to provide a first index mark movable with a cam which drives the follow-up pointer of a camera, such that the first index mark cooperates with a fixed, second index mark to indicate with accuracy the extent to which the follow-up pointer has moved beyond a predetermined position.

A further object of the invention is to render the movable index mark on the drive cam visible through a cover window just before the follow-up pointer leaves the useful meter range and to extend the window far enough so that the movable mark is visible substantially throughout the possible movement of the follow-up pointer beyond that range.

Further objects of the invention will appear from the following description, reference being made to the accompanying drawings, wherein:

Fig. 1 is a top view of the invention showing the meter and follow-up pointers, the drive cam, the shutter and its speed ring, the gearing interconnecting the cam and the speed ring, and the warning marks on the drive cam; and Fig. 2 is a top view of the portion of the mechanism shown in Fig. 1 also showing a manual adjusting knob and the cover windows for viewing the warning marks.

Referring to Fig. 1, the exposure meter is indicated generally at 10 and may be of any type well known in the art. The indicating pointer of the meter is shown at 12 and is visible throughout an arcuate viewing locus comprising a window 14 in a cover member 16 of the camera. A follow-up pointer 18 is pivoted at 20 and has a following roller 21, which is urged by a spring 22 into engagement with the periphery of a drive cam 24, illustrated as a snail cam. This cam is mounted for rotation about a stud 26 and is secured to a pinion gear 28, which engages an idler gear 30 mounted for rotation about a stud 32. Idler 30 engages the toothed periphery of a speed ring 34, rotation of which adjusts the speed of a shutter 36 to vary the exposure of photosensitive film (not shown) in the camera through a lens 38, which focuses an image of a viewed scene onto the film. The shutter may be of any known type that is adjustable by means of a movable member such as speed ring 34, and is illustrated as the type disclosed in U.S. Patent 2,102,376. In order to adjust the shutter speed as a function of scene brightness, the exposure meter is pointed toward the scene and cam 24 is rotated, for example by means of a knob 25 (Fig. 2), or by rotating the speed ring 34, until the follow-up pointer 18 moves into coincidence, i.e., is "matched," with the meter pointer 12. The cam and speed ring rotate together by means of gears 28 and 30 and thereby adjust the shutter speed in accordance with the position of the follow-up pointer, and vice versa.

A pair of index marks 40 and 42 adjacent window 14 indicate the upper and lower limits, respectively, of the useful range of the meter and of any exposure factor scale visible in window 14. When the meter pointer 12 lies beyond either limit 40 or 42, it is convenient to the photographer if he can estimate approximately how much adjustment of shutter speed or some other exposure factor would be necessary in order to return to the useful meter range, or simply how far outside that range the follow-up pointer lies.

For this purpose a pair of arcuate warning marks 44 and 46 on cam 24 cooperate with respective windows 48 and 50 in cover member 16 and with respective reference marks 52 and 54 on the cover member and adjacent these windows. If the meter pointer 12 lies outside the useful range of the meter in a counterclockwise direction and cam 24 is rotated clockwise to match two pointers, the clockwise end of the outer warning mark 44 moves past its associated reference mark 52. After the photographer has matched the pointers, he may look at window 48 and be apprised of the amount of exposure adjustment necessary to return to the useful range of the meter. The amount of adjustment is indicated by the amount of overlap between mark 44 and mark 52. Similarly, if the meter pointer is beyond the useful meter range in a clockwise direction and cam 24 is rotated counterclockwise to match the pointers, the counterclockwise end of the inner warning mark 46 passes reference mark 54 by a distance which indicates the extent to which pointers 12 and 18 lie outside that range. In the usual case, the meter has an extremely low deflection characteristic outside its useful range so that by observing only the pointers in window 14 it is almost impossible to determine the amount of exposure correction necessary to return to that range. However, because of the cam and follower relation between cam 24 and pointer 18, the cam rotates through a considerably greater angle than that of the pointer in any meter range and a useful indication can be obtained from the relative positions of marks 44 and 52 or marks 46 and 54.

The positions and arcuate lengths of windows 48 and 50 are preferably such that the warning marks 44 and 46 appear in their associated windows slightly before the follow-up pointer 18 reaches the corresponding range limits 40 and 42, and such that mark 44 or 46 is visible through its associated window substantially throughout the possible range of movement of the follow-up pointer beyond the corresponding limit mark 40 or 42.

The invention has been described in detail with particular reference to a preferred embodiment thereof, but it will be understood that variations and modifications can be effected within the spirit and scope of the invention as described hereinabove and as defined in the appended claims. It is particularly understood that the invention applies also to a camera wherein the follow-up pointer is coupled to a diaphragm mechanism rather than or in addition to a shutter mechanism.

I claim:

1. In a camera having means for focusing an image of a scene onto a photosensitive surface, and adjustable means for regulating the exposure of said surface by said image, the combination comprising: an exposure meter disposed for illumination by light from said scene and including an indicator pointer movable relative to a viewing locus and positioned by said meter as a function of the intensity of said light, said indicating pointer having a useful range of movement with at least one predetermined limit; a follow-up pointer mounted for movement relative to said locus and relative to said indicating pointer; movable drive means interrelating said exposure-regulating means and said follow-up pointer to position the latter, relative to said locus and said indicating pointer, as a function of the adjustment of said exposure-regulating means; manually operable means for adjusting said exposure-regulating means, thereby to move said follow-up pointer into visual coincidence with said indicating pointer; fixed means carrying a first index mark; and means carrying a second index mark and movable with said drive means relative to said first mark for indicating, by the position of said second mark relative to said first mark when said pointers coincide beyond said limit, the extent of adjustment of said exposure-regulating means required to return said follow-up pointer into said useful range.

2. The combination defined in claim 1, wherein said drive member comprises a cam surface and said follow-up pointer is pivotally mounted and has a cam follower in contact with said cam surface.

3. The combination defined in claim 1, wherein said means carrying said first mark comprises a cover member of said camera and said second index mark is visible through a window in said cover member, said window being adjacent said first mark.

4. The combination defined in claim 3, wherein said window extends beyond said first mark on both sides of the latter in a direction parallel to the direction of movement of said second mark, whereby said second mark is visible in said window slightly before said follow-up pointer reaches said limit within said range and is visible substantially throughout the entire possible movement of said follow-up pointer beyond said limit outside of said range.

5. In a camera including an exposure meter having a predetermined useful range, said meter having a pointer moved thereby relative to a viewing locus; and an exposure-regulating device, the combination comprising: a follow-up pointer movable relative to said locus into visual coincidence with said meter pointer; a movable drive member interrelating said follow-up pointer and said exposure-regulating device for adjusting the latter thereby to regulate exposure in said camera as a function of the position of said follow-up pointer; means carrying a first index mark and fixed relative to said camera; and means carrying a second index mark and movable with said drive member, thereby moving said second mark in cooperation with said first mark, in response to movement of said drive member to coincide said follow-up pointer with said meter pointer outside of said useful range, for indicating the extent to which said follow-up pointer lies outside said range.

6. In a camera having means for focusing an image of a scene onto a photosensitive surface, and adjustable means for regulating the exposure of said surface by said image, the combination comprising: an exposure meter disposed for illumination by light from said scene and including an indicating pointer movable relative to a viewing locus and positioned by said meter as a function of the intensity of said light, said indicating pointer having a central range of movement with respective end ranges flanking said central range; a follow-up pointer mounted for movement relative to said locus; movable drive means interrelating said exposure-regulating means and said follow-up pointer to position the latter, relative to said locus, as a function of the adjustment of said exposure-regulating means; manually operable means for adjusting said exposure-regulating means, thereby to move said follow-up pointer into visual coincidence with said indicating pointer; fixed means carrying a pair of reference marks corresponding to the respective end ranges; and means carrying a pair of warning marks cooperating with the respective reference marks and movable with said drive means relative to said reference marks, each warning mark being adapted to indicate, by its position relative to the corresponding reference mark when said pointers coincide in the corresponding end range, the extent and direction of adjustment of said exposure-regulating means required to return said follow-up pointer into said central range.

7. The combination defined in claim 6, wherein said means carrying said reference marks comprises a cover member of said camera and said warning marks are visible through respective windows in said cover member, said windows being adjacent to the respective reference marks.

8. The combination defined in claim 7, wherein each of said windows extends beyond its corresponding reference mark on both sides of the latter in a direction parallel to the direction of movement of the corresponding warning mark, whereby each warning mark is visible in its corresponding window slightly before said follow-up pointer leaves said central range to enter the corresponding end range and is visible substantially throughout the movement of said follow-up pointer in said last-named end range, and whereby no more than one of said warning marks is visible in its corresponding window at any given setting of said follow-up pointer.

References Cited in the file of this patent

UNITED STATES PATENTS

| | | |
|---|---|---|
| 2,148,963 | Rauch | Feb. 28, 1939 |
| 2,222,292 | Gorlich | Nov. 19, 1940 |
| 2,841,064 | Bagby | July 1, 1958 |